Aug. 17, 1954     C. J. FRANKLIN     2,686,307
FEATHER CLUSTER ASSEMBLING APPARATUS
Filed Dec. 9, 1952
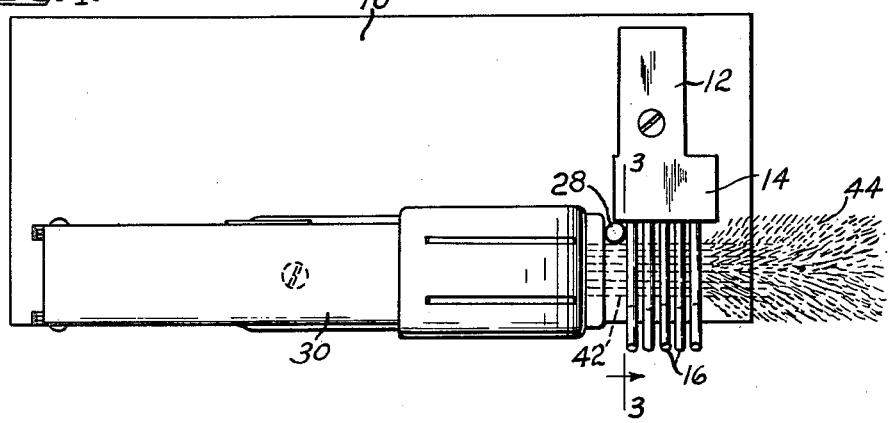
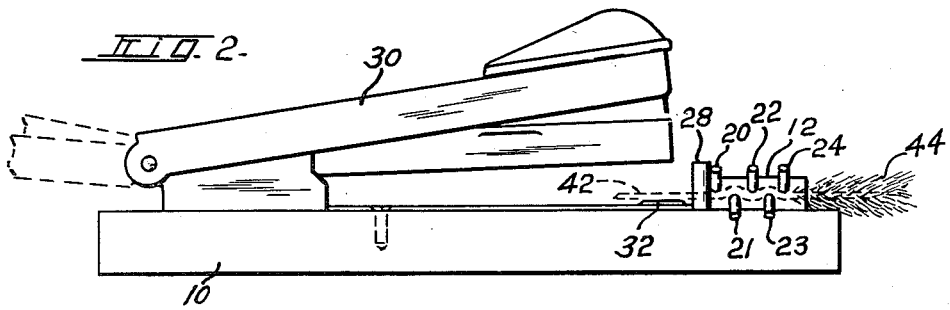
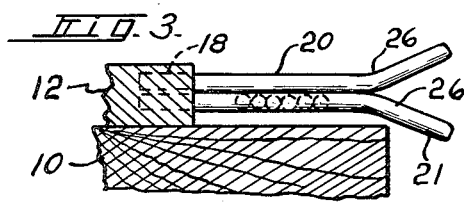
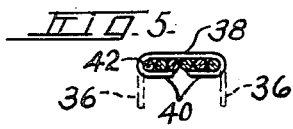
INVENTOR
CHARLES J. FRANKLIN
BY *F. P. Keiper*
ATTORNEY

UNITED STATES PATENT OFFICE 2,686,307

FEATHER CLUSTER ASSEMBLING APPARATUS

Charles J. Franklin, Rochester, N. Y.

Application December 9, 1952, Serial No. 324,892

4 Claims. (Cl. 1—170)

This invention relates to forming of feather clusters for use in fish lures, and more particularly to apparatus for forming such clusters, the method of operation, and the cluster so formed.

In an application filed December 9, 1952, Serial No. 324,891, there is disclosed a fish lure comprising a pair of plates having facing teeth for gripping a cluster of feathers adapted to trail from the lure and hide a hook, as well as attract fish. The disclosure of such application contemplates the use of clusters of feathers of substantially uniform length having their stems secured together in flat formation, all the stems lying substantially in a common plane and being bound together by a common staple.

The present invention is directed to apparatus and a procedure for readily grouping a plurality of feathers with their stems arranged in coplanar parallel relationship preparatory to securing by a wire staple, and the provision of a stapling device so disposed with respect to the apparatus as a whole that feathers held in such relationship may be quickly bound together in a flat cluster by a wire staple or the like.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view of the apparatus;

Figure 2 is a side elevation of the apparatus;

Figure 3 is a sectional view of the holding tines, enlarged, and taken substantially on the line 3—3 of Figure 1;

Figure 4 is a perspective view of the cluster formed by the apparatus; and

Figure 5 is a sectional view taken through the stems of a cluster so formed adjacent the wire staple applied thereto.

In Figures 1 and 2, there is shown a base 10 having a block 12 mounted thereon, having a head 14, from which project a plurality of tines 16. The tines have their shanks 18 embedded in the head 14 for rigid mounting, and are arranged in staggered relationship, alternate tines 20, 22 and 24 being located in a plane slightly spaced from the plane of the other intermediate tines 21 and 23. Each of the tines 20, 22 and 24 are flared away from the plane of the other tines 21 and 23, and the tines 21 and 23 are flared away from the plane of tines 20, 22, and 24, as is indicated by the slightly bent ends 26.

A vertical guide pin 28 is provided adjacent the head 14, and the adjacent end tine 20 to act as a guide, as will be hereinafter described.

Mounted on the base 10 is a stapling device 30 similar to that shown in Patent No. 2,309,779, such stapling device having an anvil 32 located adjacent the pin 28 and end tine 20. Such anvil is provided with a forming groove extending parallel with the tines and adapted to cooperate with the hammer and feed mechanism of the stapling device to form a U-shaped staple into a closed flat loop as indicated in Figure 5, the ends of the staple before forming being indicated in dotted as at 36, such ends extending from the central portion 38 of the staple. As formed by the device, as will be well understood in the art, and from the aforesaid patent, the ends 36 are flattened by the anvil 32 to correspond to the substantially closed flat loop configuration of Figure 5, wherein the ends 40 tightly engage the stems 42 of feathers 44.

In the operation of the device, a plurality of stems 42 of feathers 44 are fed in between the tines 20—24, inclusive, such operation being facilitated by the flared ends thereof. A series of six or more or less such stems are sequentially pushed into place between the tines which hold the stems 42 of the feathers in undulating form as is indicated in Figure 2. Such stems are assembled in contacting relationship with respect to one another within the tines, with their ends uniformly projecting across the anvil 32. The innermost stem is positioned against the post 28. When the desired number of feather stems are thus assembled, a staple is applied around the ends by the stapling device, and the cluster thereafter removed, such cluster having the flat arrangement as shown in Figure 4.

It will be seen that the device thus described provides a means for quickly assembling light, difficult to handle feathers, and holding such feathers during the securing thereof by a staple carried in the magazine of the stapling device. Thus the feathers are readily secured by their stems, with the stems arranged in parallel coplanar relation. Such a cluster so formed and secured is adapted to be inserted in the lure referred to in the above referred-to-application, and the flattened wire staple operates to secure the cluster against the abuse and destructive tendencies of fish attacking the lure.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An apparatus for securing a cluster of feathers together comprising a base, a block mounted on said base, a plurality of spaced parallel uniformly disposed like tines, each having one end rooted in said block and extending in staggered relation from said block, alternate tines being arranged in planes parallel with said base and being slightly displaced from one another by an amount commensurate with the tine cross-sectional dimension normal to said planes, said tines in each plane having their ends flared away from the plane of the other tines, to facilitate insertion of feather stems in undulating fashion between the tines at right angles thereto, and a stapling device mounted on said base having a clinching anvil extending parallel with said tines, said stapling device being adapted to clinch a staple against said anvil, said anvil being arranged immediately beyond an end tine and between the block and flare of the end tine, and being so disposed as to clinch staple around a plurality of feather stems extending from and held in close juxtaposed position between said tines.

2. An apparatus for securing a cluster of feathers together comprising a base, a block mounted on said base, a plurality of like parallel disposed uniformly spaced tines, each having one end rooted in said block and extending in staggered relation from said block, alternate tines being arranged in planes parallel with said base and being slightly displaced from one another by an amount commensurate with the tine cross-sectional dimension normal to said planes, said tines in each plane having their ends flared away from the plane of the other tines, to facilitate insertion of feather stems in undulating fashion between the tines at right angles thereto, a stapling device mounted on said base having a clinching anvil extending parallel with said tines, said stapling device being adapted to clinch a staple against said anvil, said anvil being arranged immediately beyond an end tine and between the block and flare of the end tine, and being so disposed as to clinch a staple around a plurality of feather stems extending from and held in close juxtaposed position between said tines, and a guide pin mounted on said base and projecting in a direction normal to the planes of said tines, and located adjacent said block, said end tine and the end of said anvil nearest said block.

3. In an apparatus for securing a cluster of feathers together a base, a block mounted on said base, a plurality of spaced parallel uniformly disposed like tines, each having one end rooted in said block and extending in staggered relation from said block, alternate tines being arranged in planes parallel with said base and being slightly displaced from one another by an amount commensurate with the tine cross-sectional dimension normal to said planes, said tines in each plane having their ends flared away from the plane of the other tines, to facilitate insertion of feather stems in undulating fashion between the tines at right angles thereto.

4. An apparatus for securing a cluster of feathers together comprising a base, a block mounted on said base, a plurality of spaced parallel uniformly disposed like tines, each having one end rooted in said block and extending in staggered relation from said block, alternate tines being arranged in planes parallel with said base and being slightly displaced from one another by an amount commensurate with the tine cross-sectional dimension normal to said planes, said tines in each plane having their ends flared away from the plane of the other tines, to facilitate insertion of feather stems in undulating fashion between the tines at right angles thereto, and means mounted on said base adapted to apply a flat binding member immediately beyond an end tine and between the block and flare of the end tine.

References Cited in the file of this patent

UNITED STATES PATENTS

| Number | Name | Date |
|---|---|---|
| 407,708 | Weaver | July 23, 1889 |
| 831,980 | Parke | Sept. 25, 1906 |
| 1,042,404 | Coutant | Oct. 29, 1912 |
| 1,420,422 | Foss | June 20, 1922 |
| 2,229,484 | Workman | Jan. 21, 1941 |
| 2,405,421 | Guyon | Aug. 6, 1946 |